Patented May 27, 1924.

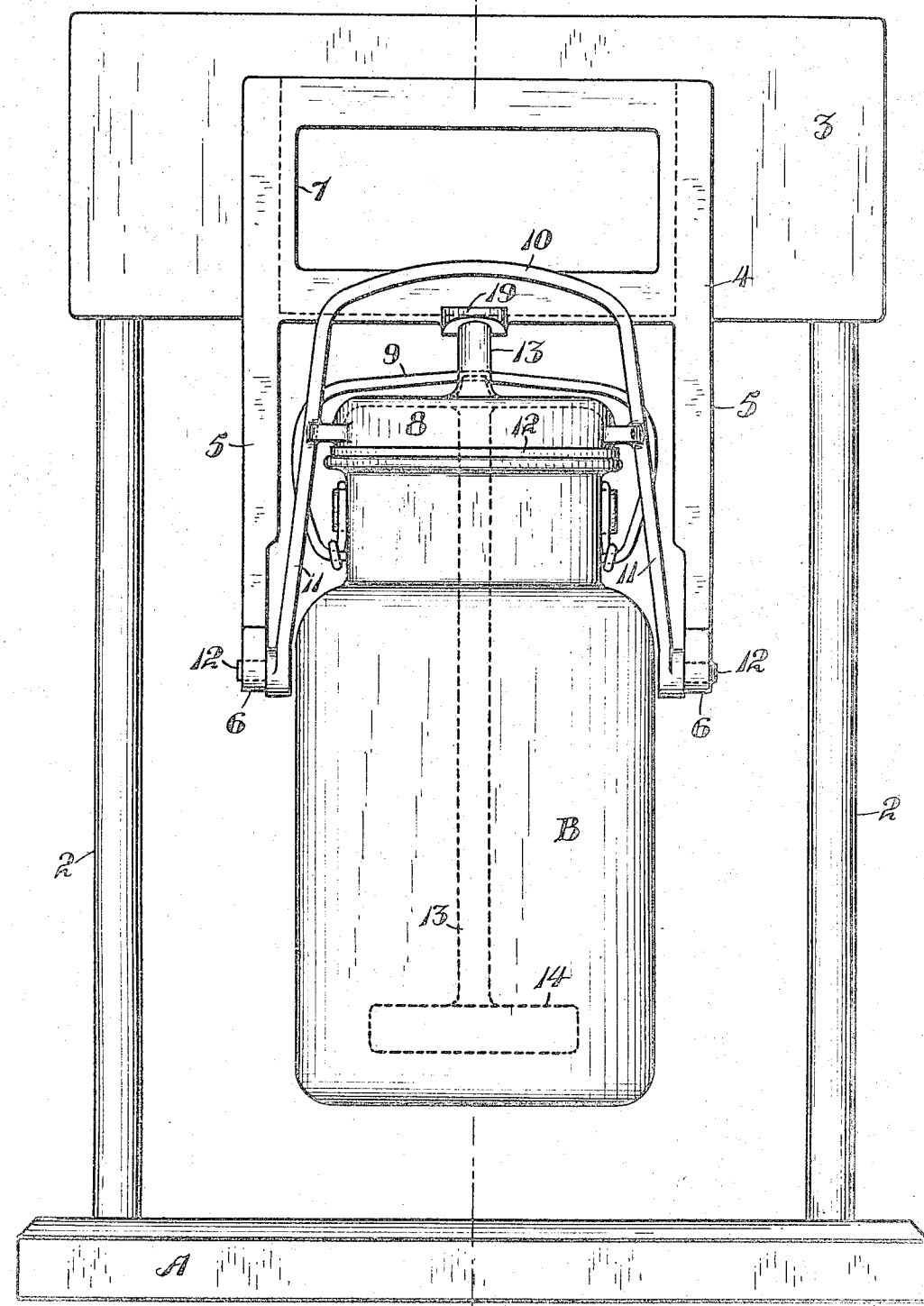

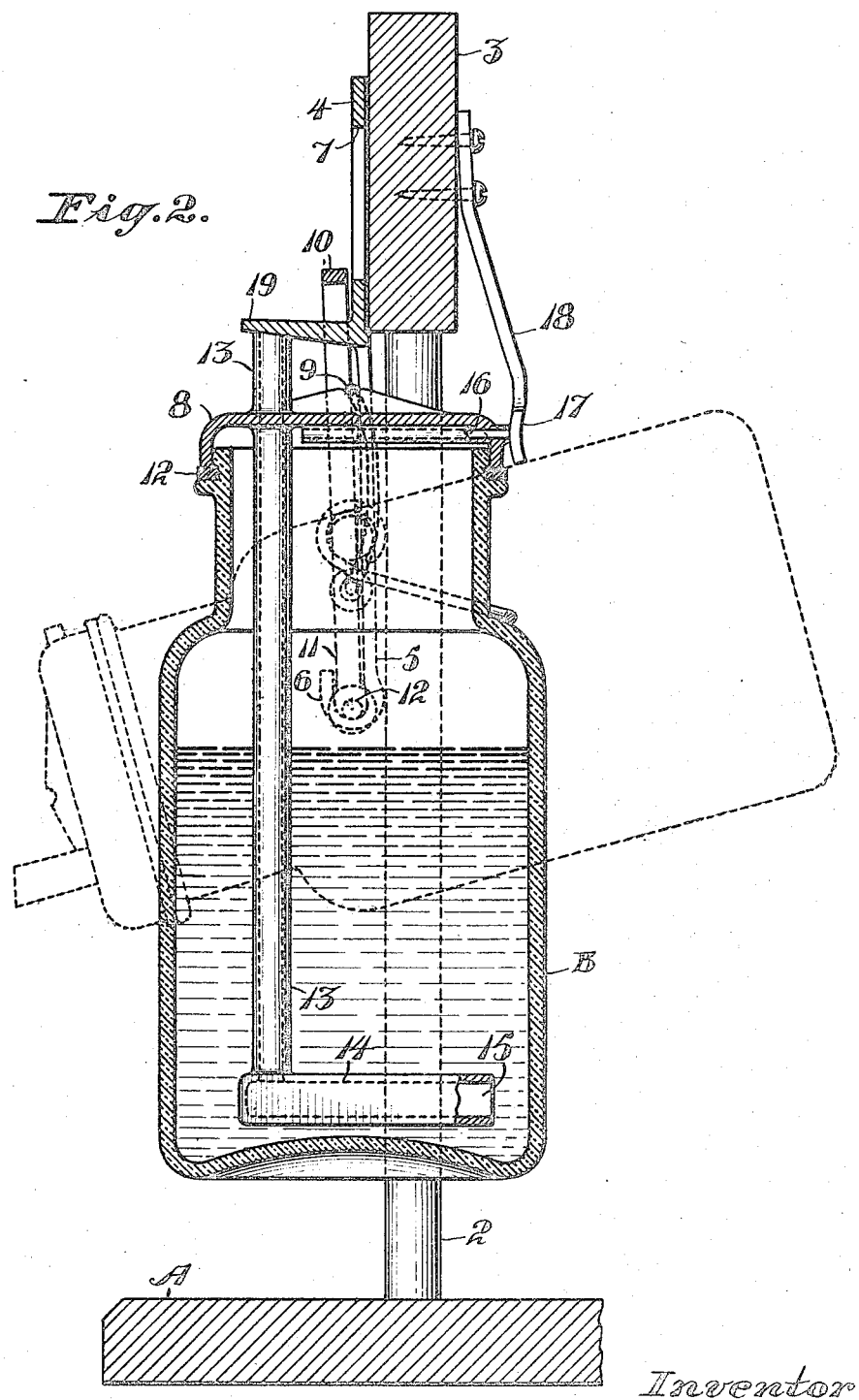

1,495,540

UNITED STATES PATENT OFFICE.

WILLIAM S. VAN SANT, OF OAKLAND, CALIFORNIA.

LIQUID DISPENSING AND MEASURING DEVICE.

Application filed July 25, 1922. Serial No. 577,271.

*To all whom it may concern:*

Be it known that I, WILLIAM S. VAN SANT, a citizen of the United States, residing at Oakland, county of Alameda, and State of California, have invented new and useful Improvements in Liquid Dispensing and Measuring Devices, of which the following is a specification.

This invention relates to a liquid dispensing and measuring device and especially to improvements over the structure shown in a copending application entitled "Liquid dispensing and measuring device," filed June 28, 1922, Serial No. 571,369.

The object of the present invention is to generally improve and simplify devices of the character described; to provide a liquid dispensing and measuring device especially adapted for dispensing sirups, extracts, etc., such as are employed in the flavoring of soft drinks, ices and the like, which are sold over the counter of a soda fountain; to provide a novel venting means and in conjunction therewith means for closing the venting opening and a cooperating pouring opening when the device is not in use; further to provide means for automatically measuring and dispensing predetermined quantities of liquids and for preventing soiling of the device by dripping or leakage of the pouring spout. Other objects will hereinafter appear.

One form which my invention may assume is exemplified in the following description and illustrated in the accompanying drawings, in which—

Fig. 1 is a front view of the liquid dispensing and measuring device.

Fig. 2 is a central, vertical, longitudinal section taken on line 2—2, Fig. 1.

Referring to the drawings in detail, A indicates a suitable base or support upon which is secured a frame consisting of a pair of vertical standards 2, and a cross frame or head member 3. Secured to the head member is a bracket plate 4 and extending downwardly therefrom is a pair of interspaced arms 5, which terminate in hook shaped bearing members 6, the function of which will hereinafter be described. Formed on the bracket plate 4 is an opening or window 7, in which may be displayed a label or card having printed thereon, or otherwise displayed, the name of the contents of the container generally indicated at B. This container is a glass jar of suitable shape which is provided with a cover member 8, this cover member being secured by a wire clamp 9 of the eccentric type, which is commonly employed on standard forms of fruit jars. Secured to the cover or forming an integral part thereof is a bail or handle member 10 which terminates in a pair of leg members 11. The lower ends of the legs are provided with outwardly projecting pins 12 and these pins are received by the hook shaped bearings 6 and are pivotally mounted therein. A rubber gasket 12 is preferably interposed between the cover and the jar and a leakproof joint is in this manner maintained. The jar proper is filled with the desired sirup and this is dispensed through a pouring spout or tube indicated at 13. This tube extends downwardly into the jar as shown and terminates in a measuring head 14. This head is closed at one end and is opened as indicated at 15 at the opposite end and the liquid may thus freely enter the measuring head when the jar assumes a vertical position, and it is dispensed when the jar is grasped by the handle 10 and tilted to the dotted line position shown in Fig. 2. The cover also carries a venting tube generally indicated at 16. This tube projects through one side of the head and is horizontally disposed when the jar assumes a vertical position. The opened end of the venting tube is normally closed when the jar assumes a vertical position by means of a stopper 17 secured on the end of a spring arm 18 which is supported by the cross bar or head member 3. The upper end of the pouring spout is also sealed and closed when the jar assumes a vertical position by means of a shoe 19 forming a part of the bracket plate 4. The lower face of this shoe is slightly inclined as shown and thereby forms a tight joint with the upper end of the pouring spout when vertical position is assumed. Ants, flies and other insects are in this manner excluded and the contents of the jar maintained in a sanitary condition as both the pouring spout and the venting tube are normally closed.

In devices of this character considerable trouble is encountered due to the tendency of soiling the cover, this being caused by the formation of drips on the end of the pouring spout which run down and collect on the cover, and also due to the fact that small amounts of liquid may escape through the venting tube, particularly if the jar is excessively filled. This objection may be entirely overcome in the present instance if excessive filling is avoided and it is entirely caused by the positioning of the venting tube and the balancing of liquids obtained thereby. This can be explained as follows, when the jar assumes a vertical position, liquid freely enters the pocket formed in the measuring head through the open end 15 and it also enters the tube 13 until the liquid levels balance. If the jar is tilted to the position shown in dotted lines in Fig. 2, the liquid contained in the tube and in the measuring head will discharge and a partial vacuum may consequently form within the jar due to the discharge of this amount of liquid. During this positioning of the jar the venting tube 16 assumes a vertical position and its inner end will thus be submerged in the liquid. Air entering through the open end of the venting tube will therefore have to pass through the liquid to relieve the partial vacuum obtained and as a hydrostatic balance is formed between the discharging liquid and the liquid surrounding the venting tube, complete relief of the vacuum formed within the jar will not be obtained. A small amount of liquid will therefore be retained in the discharging tube or spout 13, due to the slight vacuum exerted thereon and it is quickly withdrawn from the end of the spout when the jar is returned to vertical position, that is the liquid tends to return by gravity and this return movement is also assisted by the slight vacuum obtained, this slight vacuum being relieved the moment the jar is arighted as air will then enter through the venting tube and this entering air will clear the end of the venting tube and prevent the liquid from draining outwardly through the same. The formation of drips on the end of the jar spout is also prevented and soiling of the container is positively avoided. The measuring head insures a uniform delivery of liquid during each dispensing operation, or in other words insures the discharge of measured quantities during each operation of the device. The shoe 19 and the stopper 17 do not form the function of sealing members, to the extent of excluding air, but they positively prevent the admission of ants and other insects.

The entire mechanism employed is exceedingly simple and may be readily taken apart for cleaning, inspection, repairs, etc., that is the jar is secured to the cover and the cover in turn is carried by the handle 10 and the leg members 11. These leg members may be released with relation to the hook shaped bearings 6, thereby permitting the jar to be removed with relation to the stand, and when so removed it is a simple matter to release the cover by simply depressing the eccentric clamp 9. The cover may then be released with the jar and all parts are thus separated for cleaning, etc.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

By referring to Fig. 2, it will be noted that the members 17 and 18 serve two functions, first that of a closure for the venting tube 16, and secondly that of a stop to prevent excess tilting of the container. Tilting of the container beyond the dotted line position shown is not desirable as it disturbs the hydrostatic balance produced between the escaping liquids and the liquids surrounding the inner end of the venting tube.

Having thus described my invention, what I claim and desire to secure by Letters Patent is—

1. A liquid dispensing and measuring device, comprising a pivotally mounted container normally adapted to assume an upright position, a discharge tube in the container also normally assuming an upright vertical position, means connected with the tube for delivering thereto measured quantities of liquid, a cover forming a closure for the container and through which the discharge tube extends, and a venting tube extending through the cover and extending to a point adjacent the discharge tube, said venting tube being disposed at right angles to the discharge tube and the inner end of the venting tube adapted to be sealed by the liquid when the container assumes a tilted position.

2. A liquid dispensing and measuring device comprising a container, a movable support therefor permitting the container to assume a normal vertical position, and also permitting tilting of the container, a discharge tube on the container normally assuming a vertical position when the container assumes the same position, a venting tube carried by the container, and a pair of stationary members engageable with the discharge and venting tubes, respectively, when the container assumes a vertical position, said members uncovering said tubes when the container is tilted and forming closures therefor when the container assumes a vertical position.

3. A liquid dispensing and measuring device comprising a container, a pivotal support therefor permitting the container to assume a normal vertical position and also permitting tilting of the container, a discharge tube on the container normally assuming a vertical position when the container assumes the same position, a venting tube projecting into the container normally assuming a horizontal position when the container assumes a vertical position, a stationary shoe engageable with the upper end of the discharging tube and forming a closure therefor when the container assumes a vertical position, a stationary stopper engaging the venting tube when the container assumes a vertical position, and a spring arm supporting said stopper.

4. A liquid dispensing and measuring device comprising a container, a pivotal support therefor permitting the container to assume a normal vertical position and also permitting tilting of the container, a discharge tube on the container normally assuming a vertical position when the container assumes the same position, a venting tube projecting into the container normally assuming a horizontal position when the container assumes a vertical position, a stationary shoe engageable with the upper end of the discharging tube and forming a closure therefor when the container assumes a vertical position, a stopper engaging the venting tube when the container assumes a vertical position, a spring arm supporting said stopper, and a measuring device connected with the discharging tube.

5. In a liquid dispensing and measuring device of the character described, a glass jar for the reception of a liquid, a removable cover for the jar, a handle forming a part of the cover, extended legs on said handle disposed one on each side of the jar, a stationary support for said legs permitting tilting of the jar and normally causing the jar to assume a vertical position, a dispensing tube secured to the cover and extending downwardly into the jar, a venting tube secured to the cover and projecting through one side thereof, and a pair of stationary closing members carried by the stationary support and adapted to engage and close the ends of the dispensing and venting tubes, respectively, when the jar assumes a vertical position.

WILLIAM S. VAN SANT.